July 1, 1969
T. F. McHENRY
3,453,432
PYROELECTRIC RADIATION DETECTOR PROVIDING COMPENSATION FOR
ENVIRONMENTAL TEMPERATURE CHANGES
Filed June 23, 1966
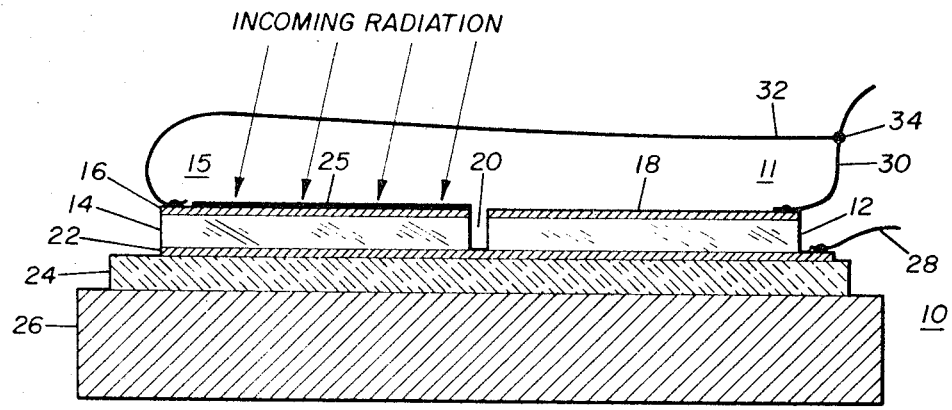
*Fig_1*
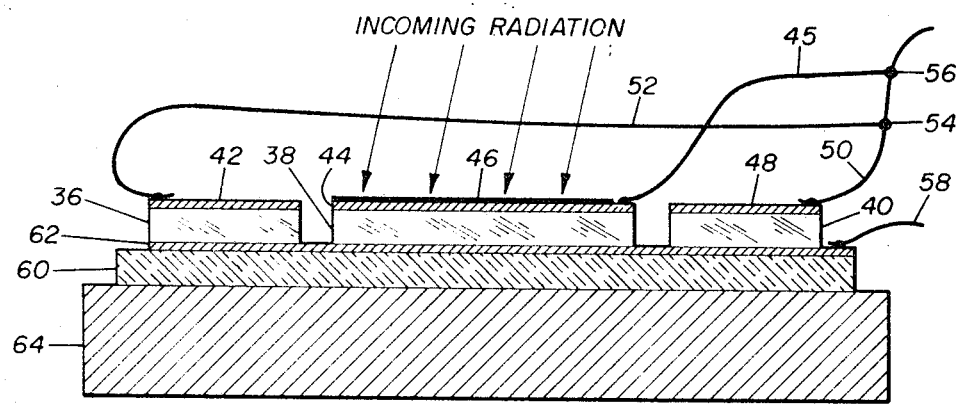
*Fig_2*
INVENTOR.
THOMAS F. McHENRY
BY Joseph Levinson United States Patent Office 3,453,432
Patented July 1, 1969

3,453,432
PYROELECTRIC RADIATION DETECTOR PROVIDING COMPENSATION FOR ENVIRONMENTAL TEMPERATURE CHANGES
Thomas F. McHenry, Norwalk, Conn., assignor to Barnes Engineering Company, Stamford, Conn., a corporation of Delaware
Filed June 23, 1966, Ser. No. 559,851
Int. Cl. G01t 1/202
U.S. Cl. 250—83.3                    6 Claims

ABSTRACT OF THE DISCLOSURE

A pyroelectric detector is provided having a first pyroelectric detector and a compensating pyroelectric detector of the same temperature-sensitive crystalline material sandwiched between two conductive electrodes in which one of the electrodes is common. The first pyroelectric detector and the compensating pyroelectric detector are polarized in opposition and connected in parallel to compensate for environmental temperature changes.

---

This invention relates to thermal radiation detectors, and more particularly to a pyroelectric thermal detector which is provided with compensation for environmental temperature changes.

Infrared detectors of the thermal type are capable of measuring radiation by absorption of incident radiation in the crystal lattice of the detector material to produce heat. Radiation detection therefore depends upon a change in temperature sensitive material to applied radiation. An example of the thermal type detector is a thermistor bolometer, whose resistance changes with changes in temperature. A thermal type detector may also be based on a thermoelectric effect whereby a junction of dissimilar metals produces a voltage with a change in temperature. A third type of thermal detector may be based on the pyroelectric effect. This type of detector is essentially a capacitor on which a charge, and consequently a voltage appear when its temperature is changed. The pyroelectric detector has several interesting advantages which stem from the fact that it is a pure capacitance and generates no internal noise. The limiting noise is usually the Johnson noise of the input resistance of the preamplifier to which it is coupled, but being a pure capacitance, the detector attenuates this noise as the frequency increases. Thus, a constant signal-to-noise ratio is maintained to frequencies much higher than the detector time constant.

One problem which is encountered in the use of pyroelectric detectors is their sensitivity to environmental temperature changes. A change in charge will appear on the pyroelectric detector whenever the temperature is changed. The detector cannot distinguish environmental temperature changes from those which are desired to be measured from incoming applied radiation. In many instances, such as substrate temperature changes, measurement of the incoming radiation may be swamped out entirely by substrate temperature changes which are of much greater magnitude than temperature changes caused by radiation.

Accordingly, it is an object of this invention to provide a pyroelectric type thermal detector which is self-compensating for environmental temperature changes.

A further object of this invention is to provide a new and improved thermal detector of the pyroelectric type having improved operating characteristics.

In carrying out this invention in one illustrative embodiment thereof, an active pyroelectric detector and a compensating pyroelectric detector which are polarized in opposite directions are connected in parallel such that temperature disturbances which affect both detectors equally, for example substrate temperature variations or radiation incident on and absorbed by both detectors caused by environmental conditions, will effectively cancel. Differential radiation, however, caused by the application of applied radiation desired to be measured on the selected detector will result in a desired signal output.

These and other advantages of this invention, along with further objects and its operation may be best understood by reference to the following description taken in connection with the accompanying drawings, in which:

FIG. 1 is a diagram of a pyroelectric detector of the type embodied in this invention, and FIG. 2 is a diagram of another embodiment of a pyroelectric detector in accordance with this invention.

Pyroelectricity is a charge generation phenomenon peculiar to a particular class of pyroelectric crystalline material. Crystals in this class can be electrically polarized and such crystals exhibit temperature dependent charge effects which can be read out by high impedance voltage-sensitive devices. A number of materials are known to exhibit pyroelectric effects. Although triglycine sulfate (TGS) is preferred for use in the pyroelectric detector of this invention, other materials, such as barium titanate, Rochelle salt, lithium sulfate, or others which exhibit the pyroelectric effect, may be utilized in the present invention.

Referring now to FIG. 1, an active pyroelectric detector 15 comprised of a pyroelectric material 14 which is sandwiched between conductive electrodes 16 and 22, and a compensating pyroelectric detector 11 comprised of a pyroelectric crystal 12 sandwiched between two conductive electrodes 18 and 22 are provided. As shown in FIG. 1, the active pyroelectric detector 15 and compensating pyroelectric detector 11 are mounted on an insulating layer 24 which is secured to a substrate 26 of high thermal conductivity which establishes a heat sink for the assembly 10. The thermal insulating layer 24 may be utilized to control the time constant of the pyroelectric detector. If a very fast time constant is desired, the pyroelectric detectors 15 and 11 may be mounted directly on the heat sink 26. A radiation absorber 25 is applied to the conducting layer 16 of the active pyroelectric detector 15. Incoming radiation may be collected and focused by a suitable optical system, either on the active pyroelectric detector 15 or on the entire unit. The conductive layer 18, being metallic, will reflect any incoming radiation, whereas the absorbing coating 25 will absorb the incoming radiation and heat up the pyroelectric crystal 14 of the active pyroelectric detector 15. Whether the incoming radiation is collected on the entire unit or only on the active pyroelectric detector will ultimately depend on the physical configuration of the entire assembly. Output leads 28, 32 and 30 are connected to the conductive layers 22, 16, and 18 respectively. Before any interconnections are made, the active pyroelectric detector 15 and the compensating pyroelectric detector 11 are initially polarized by applying a D.C. voltage across their respective conductive layers in opposite directions. This may easily be accomplished, since the direction of polarization depends on the polarity of the applied voltage. After the detectors are oppositely polarized, they are connected in parallel by joining output leads 30 and 32 at terminal 34. This parallel interconnection and opposite polarization of the detectors 15 and 11 effectively cancel any disturbances caused by substrate temperature variations. However, differential radiation on the two detectors, caused by the application of incoming radiation to the active pyroelectric detector 15 alone, or to the pair when only 15 is blackened, produces a signal, which may be applied to a preamplifier and from the preamplifier for utilization in measuring the incoming radiation. Since the capacitance of the assembly is doubled by the parallel connection, the radiant responsivity of the assembly is reduced by a factor of 2, but this is balanced by the fact that the noise is also decreased by a factor of 2, due to the increased capacity, and therefore the detectivity of the unit is unaffected.

The embodiment shown in FIG. 1 is illustrated as a preferred form of construction, in that it has a fabrication advantage. The active pyroelectric detector 15 and the compensating pyroelectric detector 11 may be fabricated from a single pyroelectric crystal, coated in a sandwich arrangement with the conductive layers, and mounted on a common heat sink 26, and then sliced at point 20. In such an arrangement, since a common crystal is utilized for both detectors, better matching is achieved, and better compensation is thereby attainable. It will be appreciated that the more nearly matched the active and compensating detectors are, the more effective will be the compensation. However, the invention is not considered limited to the mounting of the active pyroelectric detector 15 and the compensating pyroelectric detector 11 on a common substrate. They may be mounted separately, polarized oppositely as set forth above, and then connected in parallel as before. Even if the responsivity of these detectors are matched only to 10%, an improvement factor of 20 may be realized with respect to spurious signals from substrate temperature drift.

If detector matching becomes a severe problem, the suggested approach to the problem is shown in the arrangement of pyroelectric detectors of FIG. 2. In this arrangement an active pyroelectric crystal 38, having electrodes 44 and 62 and an absorptive coating 46 on the electrode 44, is mounted with the electrode 62 on an insulating layer 60, which in turn is mounted on the heat sink 64. On each side of the pyroelectric crystal 38 are pyroelectric crystals 36 and 40 having electrodes 42 and 62, and 48 and 62 respectively, with each crystal 36 and 40 being half as large in area as the central or active detector 38. Accordingly, the areas of crystal material 36 and 40 are equal to the area of the crystal detector material 38. All are mounted on a common substrate or heat sink 64 through a layer of insulating material 60. Only the active detector 38 is blacked with an absorptive coating 46. Then the active detector 38 is polarized in one direction through output leads 45 and 58, and the compensating detectors 26 and 48 are polarized oppositely to the active detector by applying a D.C. potential through output leads 52 and 58, and 50 and 58 respectively. The compensating detectors 36 and 40 are then connected in parallel at point 54, and the active detector 38 is connected in parallel with the compensating detectors at point 56. Again, this results in the cancellation of substrate temperature changes, without measurably affecting the radiation measurement capability of the device with respect to incoming radiation which is absorbed by the active detector. The additional advantage is that a temperature gradient across the detector assembly substrate produces no output whereas in the configuration of FIG. 1, an undesired output is produced. A suitable way of fabricating the arrangement of FIG. 2, although the invention is not considered limited thereto, would be the mounting of a single pyroelectric crystal on the substrate head sink, and the slicing of the detector into a quarter, a half, and a quarter. This is done by using a single pyroelectric crystal for providing a better match when the individual elements are polarized, since a single crystal will have the same polarizing characteristics, and any inhomogenities can be balanced out. As will be apparent, other configurations can be utilized, with the main consideration being that an active and a compensating detector are utilized and are polarized oppositely before being connected in parallel, to provide the desired result.

To produce perfect compensation, the active and compensating detectors should ideally be identical and have opposite polarization. However, if those characteristics producing equal and opposite *charge* are reasonably balanced, great improvement will be achieved.

Since other modifications, varied to fit particular operating requirments and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A pyroelectric radiation detector whose charge is changed with a temperature variation, which is self-compensating for environmental temperature changes, comprising
    (a) a first pyroelectric detector comprising a temperature sensitive crystal material of predetermined area sandwiched between two conductive electrodes,
    (b) a compensating pyroelectric detector comprising the same temperature sensitive crystal material of the same area as said first pyroelectric detector sandwiched between two conductive electrodes, one of which is common with an electrode of said first pyroelectric detector,
    (c) said compensating pyroelectric detector polarized opposite to the direction of polarization of said first pyroelectric detector and being responsive to undesired environmental temperature changes but in opposition to said first pyroelectric detector, and
    (d) means including a connection to said common electrode for connecting said first and second compensating pyroelectric detectors in parallel after polarization whereby said compensating pyroelectric detector compensates for a charge applied to said first pyroelectric detector by environmental radiation.

2. A pyroelectric radiation detector as set forth in claim 1 wherein a conductive electrode of said first detector has a radiation absorptive coating.

3. A pyroelectric radiation detector as set forth in claim 1 wherein said compensating pyroelectric detector is comprised of a plurality of pyroelectric detectors positioned on opposite sides of said first pyroelectric detector and having the same total area as said first pyroelectric detector and which are polarized in the same direction opposite that of said first pyroelectric detector and are connected in parallel.

4. A pyroelectric radiation detector as set forth in claim 1 in which said first pyroelectric detector and said compensating pyroelectric detector are fabricated from the same piece of pyroelectric crystal material.

5. The pyroelectric detector set forth in claim 1 wherein said pyroelectric detectors are mounted on a common substrate of high thermal conductivity.

6. The pyroelectric detector set forth in claim 5 wherein a thermal insulating layer separates said pyroelectric detectors and said common substrate.

References Cited

UNITED STATES PATENTS

| | | |
|---|---|---|
| 2,985,759 | 5/1961 | Goldsmith. |
| 3,286,524 | 11/1966 | Malone _____ 73—355 X |
| 3,287,976 | 11/1966 | Euser _____ 73—355 |
| 3,290,940 | 12/1966 | Hines _____ 73—355 X |
| 3,355,589 | 11/1967 | Clifford. |

RALPH G. NILSON, *Primary Examiner.*

SAUL ELBAUM, *Assistant Examiner.*

U.S. Cl. X.R.

73—355; 250—83; 317—247